Feb. 16, 1937. F. J. MEINZINGER 2,071,136
PROCESS FOR REPRODUCING COLORS AND APPARATUS USED THEREWITH
Filed Sept. 12, 1934 2 Sheets-Sheet 1
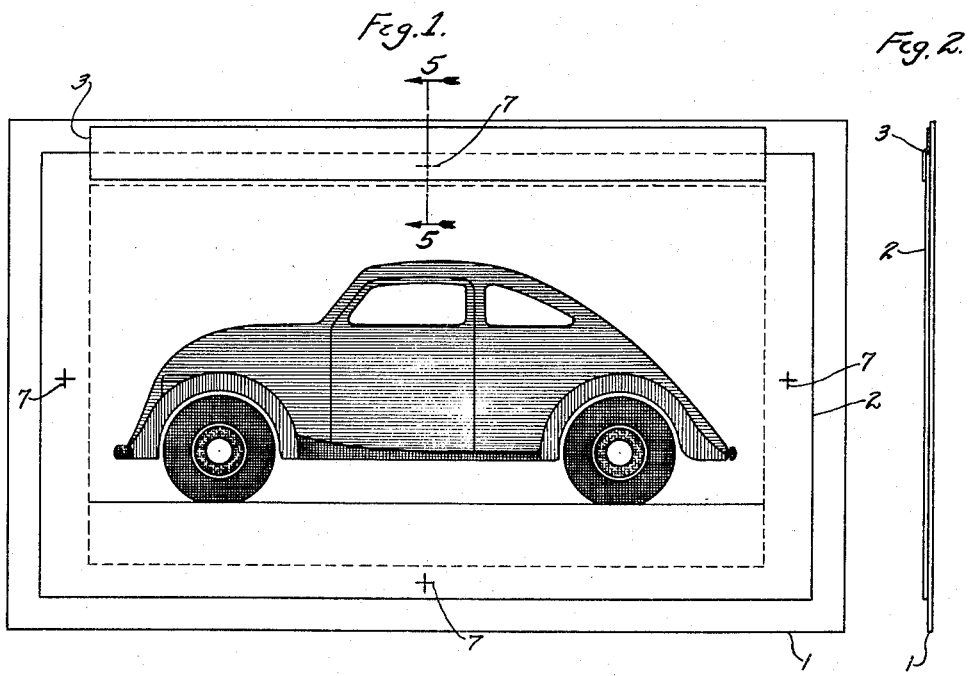
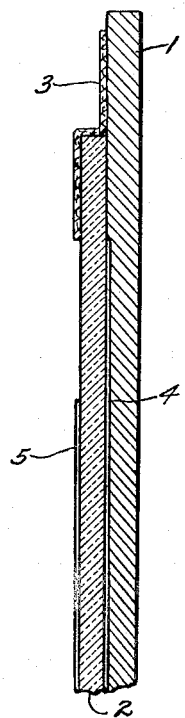
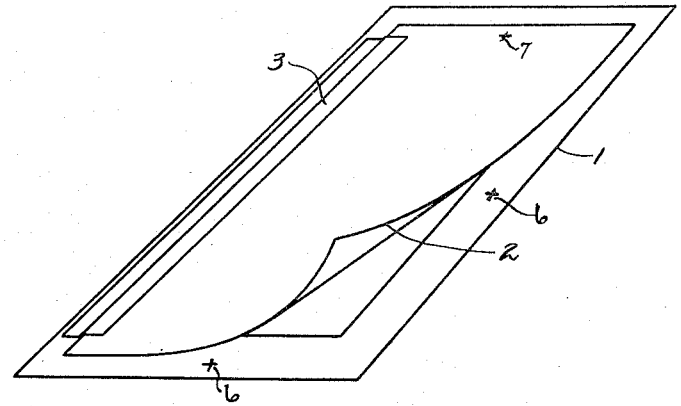
INVENTOR.
Fred J. Meinzinger
BY George B. Ingersoll
ATTORNEY.

Feb. 16, 1937.  F. J. MEINZINGER  2,071,136
PROCESS FOR REPRODUCING COLORS AND APPARATUS USED THEREWITH
Filed Sept. 12, 1934  2 Sheets-Sheet 2

INVENTOR.
BY Fred J. Meinzinger
George B. Ingersoll
ATTORNEY.

Patented Feb. 16, 1937

2,071,136

UNITED STATES PATENT OFFICE 2,071,136

PROCESS FOR REPRODUCING COLORS AND APPARATUS USED THEREWITH

Fred J. Meinzinger, Detroit, Mich., assignor to Meinograph Process, Incorporated, Detroit, Mich., a corporation of Michigan Application September 12, 1934, Serial No. 743,653

9 Claims. (Cl. 95—5.1)

My invention relates to improvements in a process for reproducing colors and apparatus used therewith; and the objects of my invention are, first, to provide a process for preparing monochrome copy for color reproduction by process engraving; second, to provide a transparent or translucent member having coloring agents applied thereon for use in juxtaposition with a monochrome to produce a full colored copy; third, to provide a process for reproducing color in which a monochrome is left intact and unchanged for making a single-color engraving; fourth, to provide a process of reproducing colors in which the colors are applied to a non-porous member; fifth, to provide apparatus for reproducing colors in which a transparent or translucent member having colors applied thereto is photographed over an opaque monochrome member so that both of said members will be visually and photographically recognized as an entirety; sixth, to provide a process of reproducing colors in which a single color on a member is used to shape and tone a plurality of colors on a second member for registration on photographic negatives from which printing plates are made; seventh, to provide a more economical process of reproducing colors than in use heretofore; eighth, to provide a process of reproducing color in which an original print may be retouched, etched, etc., without the necessity of rephotographing the subject of the original print; ninth, to provide a process of reproducing colors which is economically flexible in its control of the colors without loss of realism; tenth, to provide a process of reproducing colors which is applicable to quantity or mechanical production by reducing the necessity of the variable human element; and eleventh, to provide a process of reproducing colors whereby the colors are spaced away from a monochrome to permit a more efficient recording of the tonal values of the colors and monochrome on the negatives produced by a camera or similar photographic unit.

I attain these objects by the application illustrated in the accompanying drawings, in which—

Figure 3:
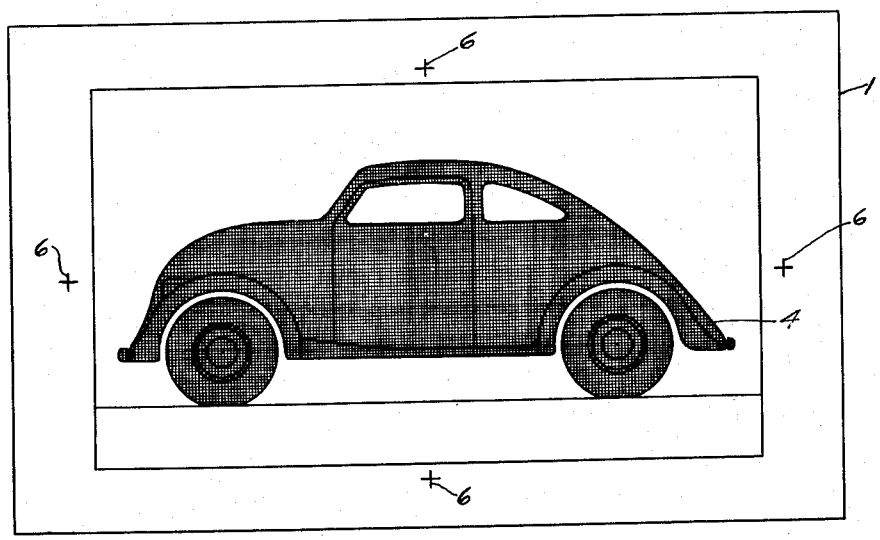
Figure 4:
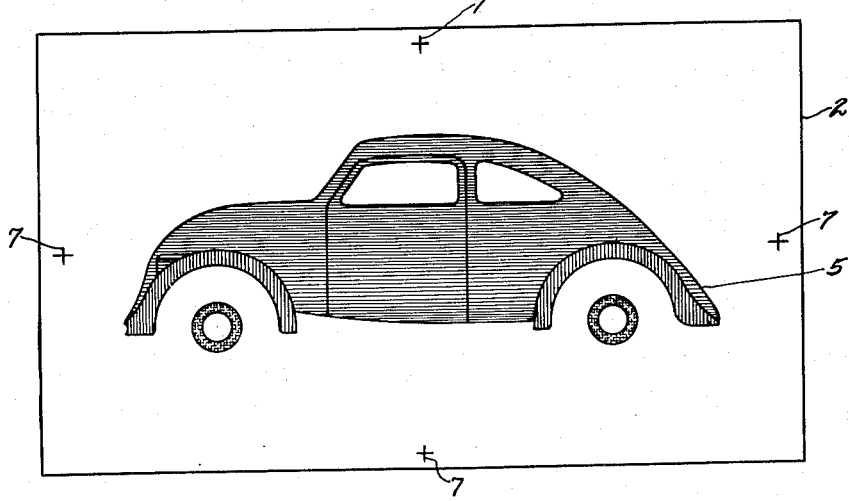

Figure 1 is a side elevation of the apparatus used in my process of reproducing colors; Fig. 2, an end elevation of the apparatus disclosed in Fig. 1; Fig. 3, a side elevation of the black picture or monochrome; Fig. 4, a side elevation of the transparent member or color film; Fig. 5, an enlarged sectional view of the apparatus used in my process for reproducing colors, said sectional view being taken on the line 5—5, Fig. 1; and Fig. 6, a perspective view of the apparatus used in my process for reproducing colors without the picture or color form thereon.

Similar numerals refer to similar parts throughout the several views.

My process of reproducing colors is a new and original method of preparing monochrome copy for color reproduction by process engraving and utilizes the application of inks, dyes or other suitable coloring agents to a transparent or translucent and preferably flexible member which may be specially treated to render it non-porous and non-absorptive to prevent the coloring agents from being absorbed thereby, said member indicated at 2, being hereinafter referred to as the color film and is of colored transparency and having preferably flexible characteristics.

The color film 2 may be suitably connected the monochrome 1, as by the hinge member 3, so as to permit the color film 2 to be placed in juxtaposition with the monochrome 1, as disclosed in Figs. 1, 2, and 5, so that the color film 2 with its colored transparency cooperates with and acts as a component portion of the monochrome 1, as desired, and at the same time permits the color film to be moved or displaced relative to the monochrome without loss of realism and to enable the color film 2 and the monochrome 1 to be used, as desired, in their separate identities.

The monochrome 1 incorporates the photograph or print which has been taken to record the picture of the original scene or object which is desired to be reproduced in colors and for purpose of illustration, the monochrome 1 is disclosed as incorporating thereon the picture 4 of an automobile which is delineated thereon by black coloring on the light surface of the monochrome 1.

It is to be especially noted that the color film 2 will incorporate a delineation or form 5 of the picture 4, said form 5 being substantially the same in area and so located on the color film 2 that when the color film 2 is pivotally moved or swung on its hinge 3 to its position adjacent or in juxtaposition with the monochrome 1, the picture 4 and the form 5 will be substantially in alignment and the superimposition of the color film over the monochrome results in the visual and practical effect of converting the monochrome into a full colored copy, and at the same time permits the removal of the color film 2, from its position of juxtaposition with the monochrome 1, to leave the monochrome 1 intact and with its original characteristics to permit the making of single color engravings therefrom as desired, thus providing a process which results in a perfect black plate from the monochrome 1 at all times and which is not possible in available processes at the present time.

Therefore when combined, the monochrome 1 and the color film 2 cooperate to form a complete unit or assembly and incorporate a colored image for visual observance and understanding as well as perfect "copy" for the making of printing plates by color-process engraving.

It is to be understood that where I have disclosed the hinge 3 as a strip of flexible or fabric material suitably secured to the monochrome 1 and the color film 2 to enable the color film to be pivotally moved or swung from its position adjacent or in juxtaposition with the monochorme 1, I do not limit the scope of my invention to such means as any suitable means may be utilized whereby the color film 2 may be moved from a position in parallelism with or adjacent the monochrome 1, as for instance suitable means may be utilized for supporting the color film so that it may be guided in its movement to and from the monochrome in a plane extending substantially at right angles to the face of the monochrome 1.

Also the monochrome 1 may be provide with the crossed lines 6 or similar medium to permit the similar crossed lines 7 or similar medium on the color film 2 to be aligned therewith to facilitate the location of the color film 2 and its color form 5 in alignment with the picture 4 on the monochrome 1.

It is to be understood that all photographic print paper, or similar material, of which the monochrome 1 and its surface is constructed, due to its fibrous and similar characteristics, is highly porous and will readily absorb transparent colors which results in the following definite and negative results, namely, first the physical mixing and absorption of the applied colors with and by the paper results in the colors becoming permanently and integrally associated with the blacks or black coloring present in the picture 4 of the monochrome and causing the colors to lose their brilliance through and by said association so that their purity is lost and is not possible of reproduction, and second, the colors thus applied to the photographic print paper cannot be removed therefrom, thereby rendering it impossible to apply alternate colors to the paper with the assurance that said colors will retain their purity or to otherwise make any alterations or corrections in the picture 4 successfully.

Therefore in exercising the basic principle of my process, I have applied and adapted definite natural laws in combination with definite mechanical operations to accomplish new results which are secured with a great saving of time and expense and with greater effectiveness than are possible by any of the present available methods or processes which my process assumes to supersede or displace.

It is also to be noted that whereas the direct application of transparent colors over and on black, as is done in processes heretofore, will not change said black to color but will on the contrary simply intensify the black to which said color is applied, the color is applied in my invention, as indicated by the form 5, to a transparent or translucent member such as the color film 2 which when used in combination with an opaque object, such as the monochrome 1, will enable the monochrome 1 and the color film 2 to be visually and photographically recognized as an entirety or assembly, the monochrome 1 supplementing certain portions of the color film 2 to utilize the tonal values in the monochrome 1 to form relatively corresponding tonal values in the color film 2.

It is also to be noted that the color form 5 will not be absorbed by the structure or materials from which the color film 2 is made, the colors of the form 5 being applied to the outer surface of the color film 2 and thus being spaced from the picture 4 on the monochrome 1, the color film 2 being constructed and if desired specially treated to render it non-porous and non-absorptive to insure the colors of the form 5 being retained on the surface of the color film 2, as clearly disclosed in Fig. 5.

It is also to be noted that the color film 2 is preferably made with flexible characteristics to enable it to conform closely to the surface of the monochrome 1 when in juxtaposition relative thereto, but I do not limit the scope of invention thereto as the color film 2 may be made, if desired, with rigid and transparent characteristics as it would be if constructed of glass or similar material.

Also it is to be noted that whereas the colors present on the color film 2 are largely what is popularly described as being "flat", certain portions of them will be interposed or strengthened by the association of the color film 2 with the monochrome 1 and the resultant showing of the monochrome 1 through the transparent color form 5 of the transparent color film 2 with the result that the coloring assumes a definite shape, acquires definite tonal values, and becomes definitely modelled or patterned and to such a degree as to permit them to fully register on the photographic negatives from which the printing plates are made.

It is to be understood that the form 5 of the color film 2 will incorporate the colors for the three color plates, namely, red, blue and yellow, which are taken in a conventional manner and incorporated integrally on the form 5 of the color film 2 and are used to delineate the form, character and tonal values present in the monochrome 1 or black plate, said monochrome 1 or black picture not being a necessary instrument in obtaining said color plates or elements and its value mainly consists of sharpening, intensifying and illuminating the effects already secured and present in said three color plates, the efficient functioning of the monochrome 1 or picture in this connection being possible because the color film 2 may be easily removed from association with the monochrome 1 to permit the monochrome 1 or picture being directly photographed to secure a pure black negative, thus saving several hours in time over the procedure ordinarily employed in making a black plate in which the making is hindered by the presence of color in the copy and which is impossible of being filtered out. Thus purity of outline in the monochrome 1 or picture together with purity of color and definition of character in the three color plates of color film 2 combinatively permit the monochrome 1 or picture to be etched to a desired fineness so that the printing thereof does not mar the brilliancy of the colors to the point where appears the customary and undesirable characteristic popularly referred to by the term "muddiness".

It is to be noted that the colors of the form 5 being located at a distance from the picture 4 of the monochrome 1 equal to the thickness of the main portion of the color film 2 upon which the form 5 is made will not only enable the colors of the form 5 to be completely picked up by the engraver's camera and fully recorded on the negatives, the camera registering the black of the monochrome 1 through the colors of the form 4 in such a manner that the black resembles shadows of the colors, but the structure of the color film 2 being relatively impenetrable will retain the colors on its surface thus enabling the colors to be easily removed when changes or corrections in the colors of the form 5 are desired and said colors can be applied relatively "flat" as the character and varying intensities of tone are imparted to them by their reflected association with the monochrome 1 over and adjacent which they are superimposed.

The use of the transparent colors of the form 5 make possible, in my process, the retention of the original photograph in every detail of line, form and character and eliminates the necessity of applying opaque color to a photograph to be reproduced in colors to remove or subdue objectionable blacks or intense shadows with consequent loss of photographic realism as is the case in processes used heretofore, as well as permitting the original photograph to be changed to present variations in the scene or object depicted without the necessity of reconstructing the actual scene or object so that a new photograph may be taken thereof, thus eliminating a considerable amount of expensive procedure.

Also the complete recording of the color by the engraver's camera without interference by solid blacks which are located on the monochrome 1 and below the color film 2 renders it less necessary to use the monochrome 1 or picture for the retention of the original modelling which in turn permits the picture to be etched away, when desired, to a point of fineness so that it ceases to detract from the brilliancy of the colors in the highlights or to hide the presence of the colors in the shadows. Also the application of the colors directly on the surface of the impenetrable and nonporous color film, instead of on the monochrome 1 or similar fibrous and porous material, renders it unnecessary to rephotograph the print on which certain necessary retouching has been done, this rephotographing being unavoidable with processes heretofore due to the fact that the colors applied directly to the print by tinting, etc., will mix with or wash away the color used in the retouching operation, my process thus eliminating not only a decided loss of "life" and sharpness but a very great expense occasioned by said rephotographing procedure.

Also my process and apparatus used therewith is a distinct improvement over the customary and conventional methods of tinting photographs which are used as substitutes for colored photography and inasmuch as color photography purports and is assumed to render a faithful reproduction of the scene or object portrayed thereby, authenticity represents a vitally negative feature in very nearly all of its uses and applications and therefore its inevitable fidelity results in serious limitations which are eliminated in my invention as hereinafter disclosed.

The processes now used in the production of color photography are inflexible because the colored photographs used therein for producing color photography cannot be altered or modified and as nothing can be added to or deleted therefrom, the objectionable portions thereof cannot be omitted or toned down, the faults as well as the virtues of said colored photographs are retained therein and as the negatives of the color camera and the engraver's camera record everything within vision, the printing plates cannot and do not depart one iota from the original subject, and nothing in said present processes can be controlled and further any attempts to do so result in departures from faithful portrayal.

In the majority of instances in color delineations it is desirable or necessary to make changes, either in form or color, in the original photograph for the purpose of obtaining a more pleasing or accurate picture, said changes consisting of deleting portions of the background, removing or including figures of persons, changing the object portrayed, as for instance lengthening or altering the picture of the automobile as disclosed in my drawings, making a "composite" of two or more photographs, toning down non-essential portions in order to render prominence to the central or main object, or changing or modifying prevailing colors and none of these various changes can be accomplished in the processes now used in color photography but are capable of being attained in my process.

Also color photography is very expensive and does not necessarily guarantee fidelity of color because this depends on perfection of lighting facilities and the absence of reflected lights, and such conditions and characteristics cannot always be controlled.

The alternatives of color photography are color drawings, comprising oil paintings and water-color drawings, and tinted photographs. Color drawings may accomplish complete control of color and background but they lack the realism of photographic effect and are not, technically and truthfully, correct reproductions of anything they presume to delineate and in addition are very expensive as their production is entirely a matter of individual skill.

Also tinted photographs while permitting full control of the subject and background together with retention of realism and economy, do not permit proper and efficient control of color for reasons hereinabove stated.

My process and its apparatus combine all of the advantages of the processes used heretofore in color photography, color drawings and tinted photographs and at the same time does not include their limitations or disadvantages, my process with its apparatus making possible the securement of the brilliancy of color in the highlights as well as the hues and "casts" in the shadows comparable with the results obtained in color photography, the control of the color as readily as is possible with color drawings, and the application of all of the flexibility, with its consequent realism and economy, as now is possible by the tinting of the photographs, and in addition in my process the copy can be used for dual purposes for in combination with the color film 2 it forms ideal copy for color reproduction and also with the color film 2 removed from the monochrome 1, the monochrome 1 is available as perfect copy for black-and-white halftones.

Also my process enables monochrome drawings, which comprise wash drawings or oil paintings, to be converted into copy for color reproduction without limiting or otherwise affecting their usefulness for single-color reproduction. My process also considerably enhances the quality of printing plates and this is due to a great extent to the fact that the black or "key" plate can be made directly from the monochrome I. When printing plates are made from color negatives, as in color photography, there is, technically, no black plate as that which serves as a black plate is virtually a duplicate of the red or blue plate which is thus used with certain mechanical manipulation and also when printing plates are made from colored copy, comprising color drawings or tinted photographs, the blacks do not photograph sharply due to the presence of color in the copy resulting in the black plate always being vague or shadowy and therefore is not a true reproduction of the copy. In my process, black copy is photographed to obtain results of clarity and sharpness of detail and mass and thereby forms the most effective "key" to intensify and supplement the tone and color values of the red, blue and yellow plates.

My process and the apparatus used therewith therefore simplifies the making of color plates as there is lesser need for manual manipulation, as in processes used heretofore; the quality of process plates is chiefly the result of human skill, experience and conscientiousness, and this is particularly true when the copy is a tinted photograph as colors which must be embodied and which have either failed to show on the copy of record or the negative must be "faked" into the plates by the operations of "staging," re-etching, and burnishing, all or any of which demands individual craftsmanship together with a keen sense of color values, thus requiring that the engraver must perform as an artist to secure true results.

My process and the apparatus used therein makes possible the perfect recording of colors on negatives and practically eliminates the variations due to the necessary use of the human element therein and renders color reproduction substantially a mechanical procedure.

Also an additional and further advantage of my process of reproducing colors together with the apparatus used therewith is that it provides opportunity for the developing and perfecting of plate-making methods, whereby plates comparable to "process" plates in general qualities can be produced in less time and at less cost than regular "process" plates. This is particularly valuable in cases where the character of the work is such that tonal values in the red, blue, and yellow plates are not relatively necessary of retention.

I claim:

1. In apparatus for reproducing colors by process engraving, the combination of a member incorporating a picture in black, and a transparent member incorporating a color film of the picture and located adjacent the front of said first mentioned member and forming a front of a pictorial subject comprising said first mentioned member and said transparent member, said color film being located in alignment with said picture, said color film having a plurality of colors, said color film together with said picture forming a complete colored copy for visual and photographic purposes in the operation of color reproduction, the tonal values of said picture of said first mentioned member being utilized as a background of the pictorial subject to form relatively corresponding tonal values in each of said plurality of colors incorporated in the color film of said transparent member.

2. In apparatus for reproducing colors by process engraving, the combination of a member incorporating a picture and a sole transparent member adjacent said first mentioned member and provided with a color film of said picture, said color film embodying three primary colors superimposed over said picture to enable said picture and said three primary colors of said color film to combine to form a full colored copy for visual and photographic purposes, said color film remaining fixedly positioned adjacent the front of said picture during the total operation of photographing said full colored copy.

3. In apparatus for reproducing colors by process engraving, the combination of a member incorporating a picture and a sole transparent member incorporating a form of said picture, said sole transparent member being deformable solely in a transverse direction relative to the surface of said form of said picture, said form embodying therein all of the colors which are to be reproduced, said sole transparent member being located adjacent the front of said picture to enable tonal values in said picture to cause said form of said sole transparent member, together with all of said colors embodied therein, and said picture of said first mentioned member, to constitute a colored image for visual and photographic purposes, said form being located in a sole fixed position adjacent the front of said picture during the entire photographing process.

4. A process for reproducing colors by process engraving consisting of making a monochrome of a picture, making a sole color film of the picture to embody a plurality of said colors to be reproduced, placing said sole color film in a sole position of contact adjacent the front side of said monochrome to form the front of a complete picture assembly, and photographing said sole color film in its sole position of contact with said monochrome, said monochrome modifying the tonal effects of all of said plurality of colors during the photographing.

5. In apparatus for reproducing colors, the combination of a monochrome embodying a member having a light colored surface together with a picture in black coloring thereon, said picture being visible on said light colored surface only of said monochrome, and a color film having transparent characteristics and embodying a sole form of said picture in a plurality of colors, said color film being deformable solely in a transverse direction relative to the surface of said sole form, said sole form of said picture being permanently attached to and forming part of said color film, said color film being located adjacent the front side of said monochrome to permit the monochrome to form the back portion of a complete picture assembly, said color film and said monochrome forming a two unit assembly adapted to be photographed to obtain a complete pictorial subject of said picture with said sole form in colors intensified by said picture of said monochrome.

6. A process for reproducing colors by process engraving consisting of making a monochrome of a picture, making a sole color film of the picture to embody a plurality of said colors to be reproduced, placing said sole color film in a sole position of contact adjacent the front side of said monochrome to form the front of a complete picture assembly, and photographing said sole color film in its sole position of contact with said monochrome, said monochrome modifying the tonal effects of all of said plurality of colors during the photographing, and means permanently connecting said monochrome and said color film to enable said color film to be moved to and from its position adjacent said monochrome.

7. In an apparatus for producing color drawings by photography, the combination of a non-transparent member comprising tonal values printed solely in black thereon of an incomplete pictorial subject, and a sole transparent member hinged to said non-transparent member and provided with an outline of said pictorial subject in a plurality of colors, said outline being an incomplete portion of said pictorial subject, said non-transparent member being adapted to be photographed through said sole transparent member to form a complete pictorial subject, said tonal values of said non-transparent member forming corresponding tonal values in said outline of said sole transparent member.

8. A process for reproducing colors consisting of making an incomplete pictorial subject in black on a non-transparent background, making a sole transparent color film forming an incomplete portion of said pictorial subject and embodying therein a plurality of colors to be reproduced, placing said sole transparent color film in a sole position adjacent and at the front of said pictorial subject in black on said non-transparent background to form the front portion of a complete pictorial subject formed by said transparent color film and said incomplete pictorial subject in black, said incomplete pictorial subject in black associating its tonal values to and through said transparent color film, and photographing said incomplete pictorial subject in black through said sole transparent color film to form a complete image in full colors.

9. A process for reproducing colors consisting of making an incomplete picture of a subject in black, mounting said incomplete picture on an opaque member to form the back portion of a complete picture, making a second incomplete picture of said subject in a plurality of colors on a sole transparent support member, aligning said sole transparent support member adjacent the front side of said opaque member with said sole transparent support member always between said incomplete picture in said plurality of colors and said incomplete picture in black of said opaque member, said second incomplete picture and its sole transparent support member forming the front portion of said complete picture, and photographing said incomplete picture of said subject in black on said opaque member through said second incomplete picture and its sole transparent support member to obtain said complete picture of said subject, said first mentioned incomplete picture being visualized through said second incomplete picture and its sole transparent support member as said complete picture embodying tonal values developed by aligned association of said incomplete pictures and said sole transparent support member.

FRED J. MEINZINGER.